(No Model.)
W. H. F. JOHNSON.
KNIFE SHARPENER.
No. 583,182. Patented May 25, 1897.
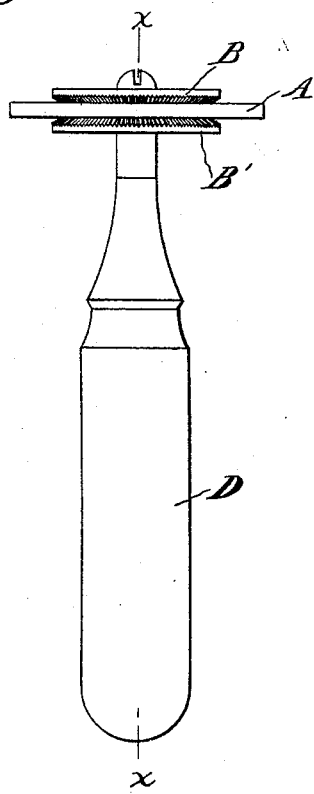
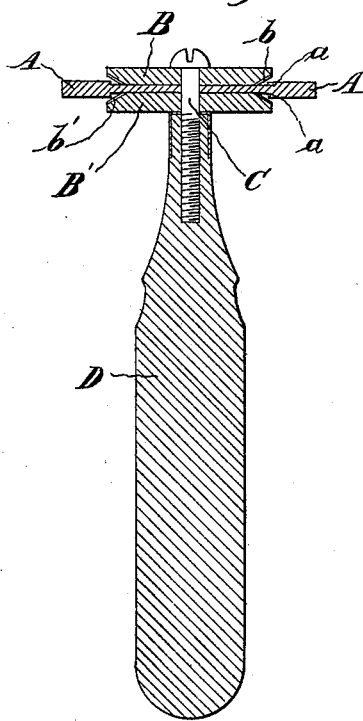
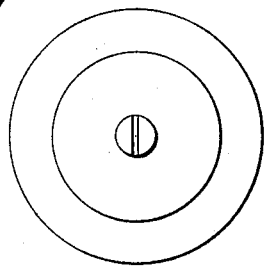
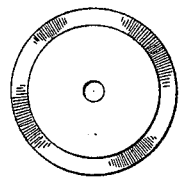
WITNESSES:
INVENTOR
W. H. F. Johnson
ATTORNEYS

UNITED STATES PATENT OFFICE.

WILLIAM HENRY FRANCIS JOHNSON, OF BROOKLYN, NEW YORK.

KNIFE-SHARPENER.

SPECIFICATION forming part of Letters Patent No. 583,182, dated May 25, 1897.

Application filed February 23, 1897. Serial No. 624,673. (No model.)

*To all whom it may concern:*

Be it known that I, WILLIAM HENRY FRANCIS JOHNSON, a citizen of the United States, and a resident of Brooklyn, county of Kings, and State of New York, have invented certain new and useful Improvements in Knife-Sharpeners, of which the following is a specification, reference being had to the accompanying drawings, forming a part thereof, in which similar letters of reference indicate corresponding parts.

This invention relates to improvements in knife-sharpeners, the object thereof being to produce a device of this character which can be successfully used by unskilled persons without danger of accident.

The device is adapted for alternate action upon both sides of the knife-blade, whereby a sharp and even edge can be supplied thereto, and it is simple in construction, inexpensive, and durable.

The invention will be hereinafter fully described, and specifically set forth in the annexed claims.

In the accompanying drawings, forming part of this specification, Figure 1 is a vertical elevation of my improved device. Fig. 2 is a vertical sectional elevation taken on a line $x\ x$ of Fig. 1. Fig. 3 is a plan view of the device, and Fig. 4 is a plan of one of the cutters forming part thereof.

In the practice of my invention I provide a disk A. This said disk has recesses $a$ formed upon both sides thereof. Engaging with this disk upon the two respective sides thereof are cutting-disks B and B', supplied, respectively, with tapering edges $b$ and $b'$, which said edges are serrated or milled for cutting a sharp edge upon the blade to be sharpened. These said cutting-disks are located centrally of the disk A upon each side thereof and they are held in place by means of a spindle C, which clamps them tightly together and prevents any rotary or lateral motion of the disks. This said spindle is screwed into a handle D, which is adapted for use in operating the device.

I do not confine myself to the specific means employed for assembling the parts, as the spindle may form an integral part of the handle and it may be riveted at its outer end for fastening the disks together.

In the operation of the device a user will grasp the handle D in the left hand and draw the blade between the disk A and the beveled surface of the disk B until a tapering edge is formed upon the blade. The blade is then placed between the lower surface of the disk A and the beveled edge of the disk B' and drawn until a reverse taper is placed thereon, whereby a sharp and even cutting edge will be supplied.

Having thus described my said invention, what I claim as new, and desire to secure by Letters Patent, is—

1. A knife-sharpener comprising two disks having beveled serrated edges, and an enlarged disk having annular recesses upon each side thereof located between the two said beveled disks, said parts being connected to each other concentrically, and means for connecting them, substantially as shown and described.

2. In a knife-sharpener, the combination of a centrally-located disk, having annular recesses on each side thereof, and two beveled disks engaging respectively with the said annular recesses, the said disks having their beveled edges serrated, and a spindle for connecting the parts concentrically to each other and to a handle, substantially as shown and described.

3. The combination of a handle, with two disks having serrated beveled edges and a centrally-located disk having recesses therein engaging with the said beveled edges, and a spindle for connecting the said disks to the handle, substantially as shown and described.

In testimony that I claim the foregoing as my invention I have signed my name, in presence of two witnesses, this 18th day of February, 1897.

WILLIAM HENRY FRANCIS JOHNSON.

Witnesses:
WILLIAM J. THORN,
CLARA THORN.